(12) United States Patent
Han et al.

(10) Patent No.: US 12,222,507 B2
(45) Date of Patent: Feb. 11, 2025

(54) OPTICAL WAVEGUIDE STRUCTURE, AR DEVICE, AND METHOD FOR OBTAINING EMERGENT LIGHT EFFICIENCY OF OPTICAL WAVEGUIDE STRUCTURE

(71) Applicants: Beijing BOE Display Technology Co., Ltd., Beijing (CN); BOE Technology Group Co., Ltd., Beijing (CN)

(72) Inventors: Na Han, Beijing (CN); Chenru Wang, Beijing (CN); Ruijun Dong, Beijing (CN); Yulong Wu, Beijing (CN); Ke Li, Beijing (CN); Jiarong Bai, Beijing (CN); Zhanshan Ma, Beijing (CN); Haitao Huang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/790,000

(22) PCT Filed: Sep. 1, 2021

(86) PCT No.: PCT/CN2021/116057
§ 371 (c)(1),
(2) Date: Jun. 29, 2022

(87) PCT Pub. No.: WO2023/028925
PCT Pub. Date: Mar. 9, 2023

(65) Prior Publication Data
US 2024/0184111 A1    Jun. 6, 2024

(51) Int. Cl.
*G02B 6/34* (2006.01)
*G02B 5/18* (2006.01)
*G02B 27/01* (2006.01)

(52) U.S. Cl.
CPC ....... *G02B 27/0172* (2013.01); *G02B 5/1819* (2013.01); *G02B 6/34* (2013.01)

(58) Field of Classification Search
CPC .............. G02B 6/0036; G02B 27/0081; G02B 6/0016; G02B 5/1819
See application file for complete search history.

(56) References Cited

U.S. PATENT DOCUMENTS 10,598,938 B1    3/2020   Huang et al.
10,962,787 B1 *  3/2021   Lou ...................... G02B 6/0036
(Continued)

FOREIGN PATENT DOCUMENTS

CN    104614857 A    5/2015
CN    106707389 A    5/2017
(Continued)

*Primary Examiner* — Eric Wong
(74) *Attorney, Agent, or Firm* — IPro, PLLC

(57) ABSTRACT

Provided are an optical waveguide structure, an Augmented Reality (AR) device, and a method for obtaining an emergent light efficiency of an optical waveguide structure, which relates to the technical field of display. The optical waveguide structure includes: an optical waveguide body, a coupling-in grating disposed at the optical waveguide body, and a plurality of coupling-out gratings distributed and arranged. The coupling-in grating is configured to couple image light into the optical waveguide body. The optical waveguide body is configured to generate a total internal reflection of the image light to the coupling-out gratings. Diffraction efficiencies of each of the coupling-out gratings are different, and each of the coupling-out gratings is configured to couple the image light out of the optical waveguide body at the same brightness.

1 Claim, 3 Drawing Sheets

(56) References Cited

U.S. PATENT DOCUMENTS

| | | | | |
|---|---|---|---|---|
| 11,137,603 | B2* | 10/2021 | Zhang | G02B 6/0025 |
| 11,513,350 | B2* | 11/2022 | Waldern | G02B 27/0081 |
| 2016/0231568 | A1* | 8/2016 | Saarikko | G02B 5/1866 |
| 2020/0150430 | A1* | 5/2020 | Minemura | G02B 27/0101 |
| 2021/0257179 | A1 | 8/2021 | Olson et al. | |

FOREIGN PATENT DOCUMENTS

| | | | |
|---|---|---|---|
| CN | 108734292 | A | 11/2018 |
| CN | 110764260 | A | 2/2020 |
| CN | 112099141 | A | 12/2020 |
| CN | 112180594 | A | 1/2021 |
| CN | 113302542 | A | 8/2021 |

* cited by examiner

OPTICAL WAVEGUIDE STRUCTURE, AR DEVICE, AND METHOD FOR OBTAINING EMERGENT LIGHT EFFICIENCY OF OPTICAL WAVEGUIDE STRUCTURE

TECHNICAL FIELD

The present disclosure relates to the technical field of displaying, and more particularly, to an optical waveguide structure, an Augmented Reality (AR) device, and a method for obtaining an emergent light efficiency of an optical waveguide structure.

BACKGROUND

AR display technology is a technology of cleverly integrating virtual information and the real world. The virtual information generated by computers such as text, images, three-dimensional models, music, and video is simulated and then applied to the real world. The two kinds of information complement each other, so as to achieve the "enhancement" of the real world. The AR display technology is generally composed of an image source and an optical transmission system. Image frames emitted by the image source are transmitted to the human eyes via the optical transmission system. A diffraction optical waveguide technology in an AR optical system is more critical.

SUMMARY

The present disclosure provides an optical waveguide structure, an AR device, and a method for obtaining an emergent light efficiency of an optical waveguide structure.

Some embodiments of the present disclosure provide an optical waveguide structure. The optical waveguide structure includes: an optical waveguide body, a coupling-in grating disposed at the optical waveguide body, and a plurality of coupling-out gratings distributed and arranged.

the coupling-in grating is configured to couple image light into the optical waveguide body.

the optical waveguide body is configured to generate a total internal reflection of the image light to the coupling-out gratings.

diffraction efficiencies of each of the coupling-out gratings are different, and each of the coupling-out gratings is configured to couple the image light out of the optical waveguide body at the same brightness.

Optionally, the coupling-out grating includes: a surface relief grating.

Optionally, duty cycles are different for each of the surface relief gratings.

Optionally, grating inclinations are different for each of the surface relief gratings.

Optionally, the coupling-out grating includes: a volume holographic grating.

Optionally, refractive indexes are different for each of the volume holographic gratings.

Optionally, the optical waveguide structure further includes: a collimating lens disposed in parallel at a side of the coupling-in grating away from the optical waveguide body, wherein the collimating lens is configured to emit the image light into the coupling-in grating in parallel.

Optionally, the collimating lens includes: a plurality of aspherical lenses or spherical lenses.

Optionally, the optical waveguide structure further includes: a display screen disposed at a side of the collimating lens away from the coupling-in grating, wherein the display screen is configured to emit the image light from a light-emitting side to the collimating lens.

Some embodiments of the present disclosure provide an AR device, including the optical waveguide structure described above.

Some embodiments of the present disclosure provide a method for obtaining an emergent light efficiency of an optical waveguide structure. The method includes:
  obtaining a diffraction efficiency and a reflection efficiency of each of the coupling-out grating in the optical waveguide structure as described above: and
  obtaining an emergent light efficiency of the optical waveguide structure according to the diffraction efficiency and the reflection efficiency.

Optionally, the obtaining the emergent light efficiency of the optical waveguide structure according to the diffraction efficiency and the reflection efficiency includes:

Obtaining the emergent light efficiency of the optical waveguide structure according to the following formula:

$$\eta = \sum_{n=1}^{N} (R^{n-1} \times R^{n-2} ... R^0) \times T^n$$

$$R^n = 1 - T^n$$

wherein η represents the emergent light efficiency, n represents the number of coupling-out gratings, N represents the total number of coupling-out grating partitions, $R^{n-1}$ represents the reflection efficiency of the $(n-1)^{th}$ coupling-out grating, and $T^n$ represents the diffraction efficiency of the $n^{th}$ coupling-out grating.

Optionally, obtaining the diffraction efficiency of each of the coupling-out gratings in the optical waveguide structure according to the following formula:

$$T_n = (N-n+1)^{-1}$$

wherein $T^n$ represents the diffraction efficiency of the $n^{th}$ coupling-out grating, n represents the number of coupling-out gratings, and N represents the total number of coupling-out grating partitions.

The above description is merely a summary of the technical solutions of the present disclosure. In order to more clearly know the technical means of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the drawings required to describe the embodiments or the prior art will be briefly introduced below. Apparently, the drawings described below are merely some embodiments of the present disclosure, and those ordinarily skilled in the art may obtain other drawings according to these drawings without paying creative work.

DETAILED DESCRIPTION OF THE EMBODIMENTS

In order to make the purposes, technical solutions and advantages of the embodiments of the present disclosure more apparent, the technical solutions in the embodiments of the present disclosure will be clearly and completely described below with reference to the drawings in the embodiments of the present disclosure. Apparently, the described embodiments are merely certain embodiments of the present disclosure, rather than all of the embodiments. All of the other embodiments obtained by those ordinarily skilled in the art at the basis of the embodiments of the present disclosure without paying creative work fall within the protection scope of the present disclosure.

In the related art, an optical waveguide system mainly includes a display screen, a collimating lens group, a coupling-in grating, an optical waveguide plate, and a coupling-out grating. An image frame emitted by an image source is diffracted via the coupling-in grating, the light of order of −1 enters a waveguide for total reflection, to reach the coupling-out grating, and is diffracted into human eyes, thereby completing transmission of the image frame. If the diffraction efficiency is same during the whole coupling-out grating, light efficiency and in-eye brightness near a coupling-in grating region will be high, and light efficiency and in-eye brightness far away from the coupling-in grating will be low, whereby the light efficiency inside a pupil formed by the optical waveguide system is reduced in sequence, and the brightness is uneven at exit pupils of eyes.

Figure 1:
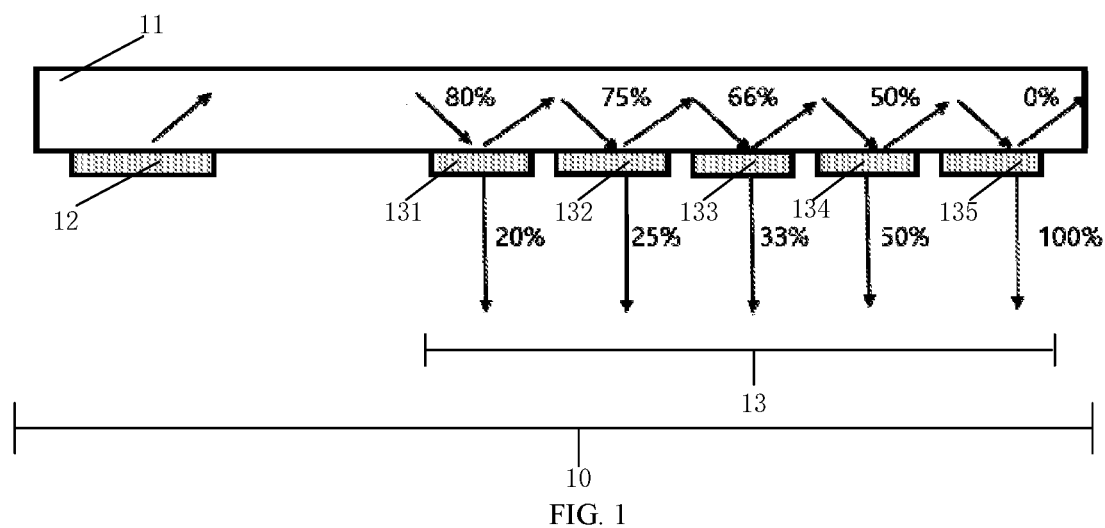
FIG. 1 schematically shows a structural diagram of an optical waveguide structure provided by some embodiments of the present disclosure.

FIG. 1 schematically shows a structural diagram of an optical waveguide structure 10 provided by the present disclosure. The optical waveguide structure includes: an optical waveguide body 11, a coupling-in grating 12 disposed at the optical waveguide body 11, and a plurality of coupling-out gratings 13 partitioned and arranged. The coupling-in grating 12 is configured to couple image light into the optical waveguide body 11. The optical waveguide body 11 is configured to generate a total internal reflection of the image light to the coupling-out gratings 13. Diffraction efficiencies of each of the coupling-out gratings are different, and each of the coupling-out gratings is configured to couple the image light out of the optical waveguide body at the same brightness.

There may be a plurality of coupling-out gratings 13 in the optical waveguide structure 10 provided by an embodiment of the present disclosure. For example, the coupling-out grating 13 may include: coupling-out gratings 131, 132, 133, 134, and 135, which are arranged in sequence from left to right and in contact with each other. The five coupling-out gratings are arranged from left to right, and the intensity of received image light is reduced in sequence since the number of reflections of the received image light by the coupling-out gratings is increased in sequence. It should be understood that, for example, the light intensity of image light reflected by the coupling-out grating 131 after being totally reflected to the coupling-out grating 131 by the optical waveguide body 11 tends to be reduced, and therefore the light intensity of the image light will be less than that of image light received by the coupling-out grating 131 when the image light is reflected by the coupling-out grating 131 and then totally reflected to the coupling-out grating 132 by the optical waveguide body 11. Therefore, in the embodiments of the present application, different diffraction efficiencies are set for each of the coupling-out gratings according to the reduction of image intensity caused by the reflection phenomenon experienced by the image light received by each of the coupling-out gratings, whereby the brightness of the image light diffracted by the coupling-out gratings even if the light intensity of the received image light is different may be kept consistent. Therefore, the uniform distribution of light intensity in the whole pupil formed by the image light emitted from each of the coupling-out grating 13 in the optical waveguide structure 10 is a light efficiency that actually entering eyes, and the light efficiency is obtained by multiplying the diffraction efficiency of image light of the order of −1 of the coupling-in grating by the total light efficiency value of the coupling-out grating.

It should be noted that each of the coupling-out gratings 13 may be arranged in contact to avoid the situation of incomplete pupils formed by the optical waveguide structure due to the presence of gaps between the coupling-out gratings 13.

For example, in an ideal state, assuming that the diffraction efficiency of image light of the order of −1 is 100%, a diffraction efficiency of the coupling-out grating 131 is 20% and a reflection efficiency is 80%, a diffraction efficiency of the coupling-out grating 132 is 25% and a reflection efficiency is 75%, and so forth, a diffraction efficiency of the coupling-out grating 133 is 33% and a reflection efficiency is 66%, a diffraction efficiency of the coupling-out grating 134 is 50% and a reflection efficiency is 50%, and diffraction efficiency of the coupling-out grating 135 is 100% and a reflection efficiency is 0%. Therefore, the light efficiency of each of the coupling-out gratings is 20%, i.e., the brightness of the image light emitted by each of the coupling-out gratings is 20% of the brightness of the image light emitted into the optical waveguide body 11, whereby the brightness of the image light emitted by the coupling-out gratings remains consistent, and the efficiency of light finally emitted is 100%*20%=20%. Certainly, it is merely a example herein. The diffraction efficiency of the coupling-out gratings cannot reach 100% in an actual state, and setting parameters of the coupling-out gratings may be set according to actual requirements. The coupling-out gratings are applicable to the embodiments of the present disclosure so long as the brightness of the image light emitted by the coupling-out gratings is as consistent as possible. Limitations are omitted herein.

In the embodiments of the present disclosure, the brightness within a pupil formed by the optical waveguide structure may be uniformly distributed by providing coupling-out gratings with different diffraction efficiencies in the optical waveguide structure such that coupling-out gratings at different arrangement positions may couple image light out of the optical waveguide body at the same brightness.

Figure 2:
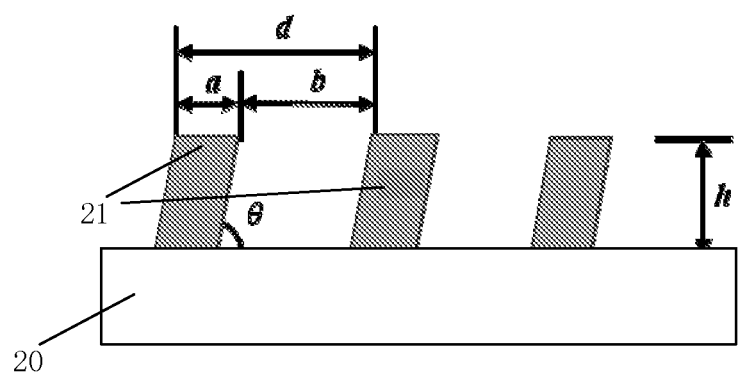
FIG. 2 schematically shows a structural diagram of a surface relief grating provided by some embodiments of the present disclosure.

Optionally, referring to FIG. 2, in some embodiments of the present disclosure, the coupling-out grating 13 includes: a surface relief grating 20.

Optionally, in some embodiments of the present disclosure, duty cycles are different for each of the surface relief gratings.

Referring to FIG. 2, in the embodiments of the present disclosure, a grating 21 is provided with a bottom edge length of a, and a distance between two adjacent gratings 21 is b. Then, a relative point distance between two adjacent gratings is d obtained by adding a to b. In the case that the setting parameter is the same for each grating in the surface relief grating 20, the duty cycle of the surface relief grating 20 is a divided by d. Therefore, the duty cycle of the surface relief grating 20 may be adjusted by adjusting the bottom edge length a of the grating 21 and the distance b between two adjacent gratings 21.

Figure 3:
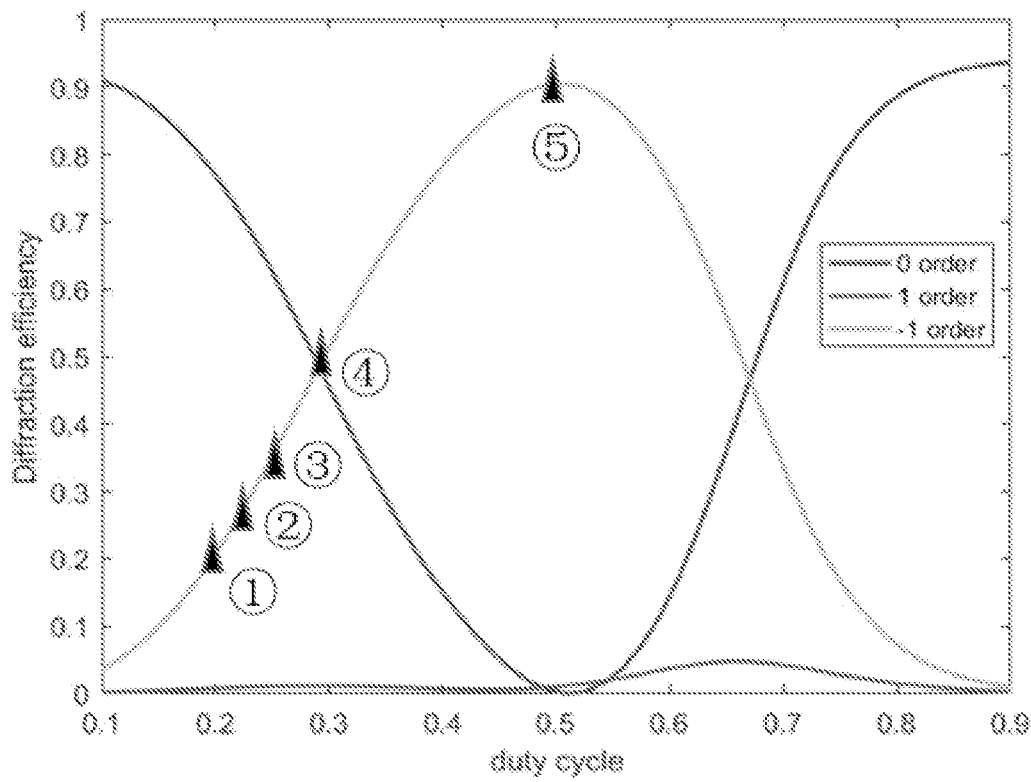
FIG. 3 schematically shows a diagram of a relationship between a diffraction efficiency and a duty cycle provided by some embodiments of the present disclosure.

Specifically, referring to FIG. 3, an abscissa axis represents a duty cycle, an ordinate axis represents a diffraction efficiency, the order of 0 represents a relation curve between the diffraction efficiency corresponding to the diffraction order of 0 and the duty cycle of the grating, the order of 1 represents a relation curve between the diffraction efficiency corresponding to the diffraction order of 1 and the duty cycle of the grating, and the order of −1 represents a relation curve between the diffraction efficiency corresponding to the diffraction order of −1 and the duty cycle of the grating. In practical use, the required diffraction efficiency of the grating may be determined according to a reverse situation experienced by the image light received by the coupling-out grating, so that the corresponding duty cycle may be queried in the order of −1 relation curve in the figure according to the required diffraction efficiency. For example, when the required duty cycle is 20%, a duty cycle of 0.2 corresponding to mark (1) therein may be selected. When the required duty cycle is 50%, a duty cycle of 0.3 corresponding to mark (5) therein may be selected. Certainly, it is merely an example herein. A specific relation curve between the duty cycle and the diffraction efficiency may be determined by experimentations according to actual situations. Limitations are omitted herein.

Optionally, referring to FIG. 2, in some embodiments of the present disclosure, grating inclinations θ are different for each of the surface relief gratings 20.

In the embodiments of the present disclosure, a relation curve between the diffraction efficiency and the grating inclination θ of the surface relief grating 20 may be obtained through actual software simulation and calculation. Then, during actual use, the required diffraction efficiency of the grating may be determined according to the reverse situation experienced by the image light received by the coupling-out grating. Therefore, the required grating inclination is obtained by querying the relation curve between the diffraction efficiency and the grating inclination θ according to the required diffraction efficiency, so as to set the surface relief grating.

Optionally, in some embodiments of the present disclosure, the coupling-out grating 13 includes: a volume holographic grating.

Optionally, in some embodiments of the present disclosure, refractive indexes are different for each of the volume holographic gratings.

In the embodiments of the present disclosure, since the diffraction efficiency of the volume holographic grating is related to the refractive index between the relative gratings, a relation curve between the diffraction efficiency and the refractive index may be obtained through software simulation and calculation. Then, during actual use, the required diffraction efficiency of the grating may be determined according to the reverse situation experienced by the image light received by the coupling-out grating. Therefore, the required refractive index is obtained by querying the relation curve between the diffraction efficiency and the refractive index according to the required diffraction efficiency, so as to set the volume holographic grating.

Figure 4:
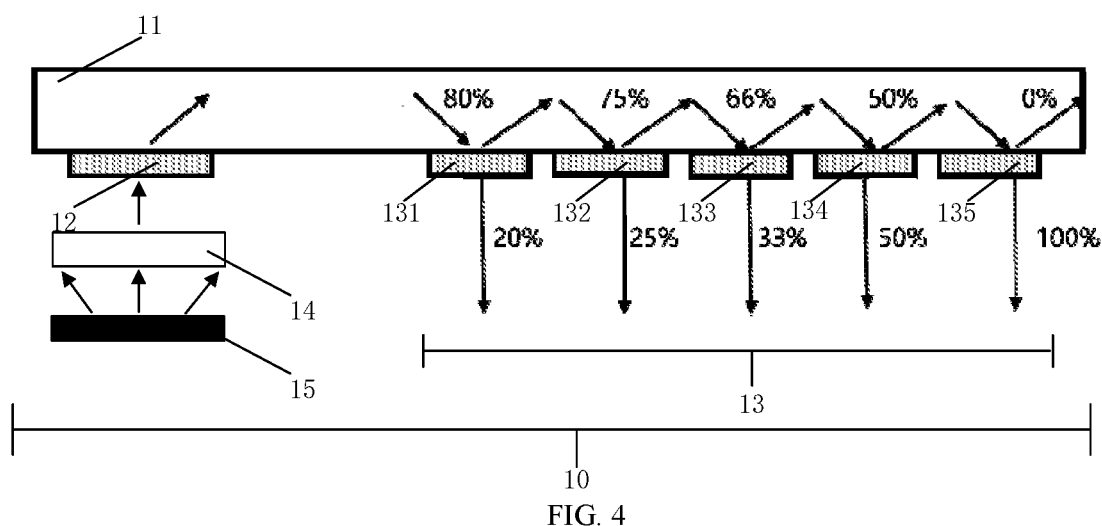
FIG. 4 schematically shows a structural diagram of another optical waveguide structure provided by some embodiments of the present disclosure.
Figure 5:
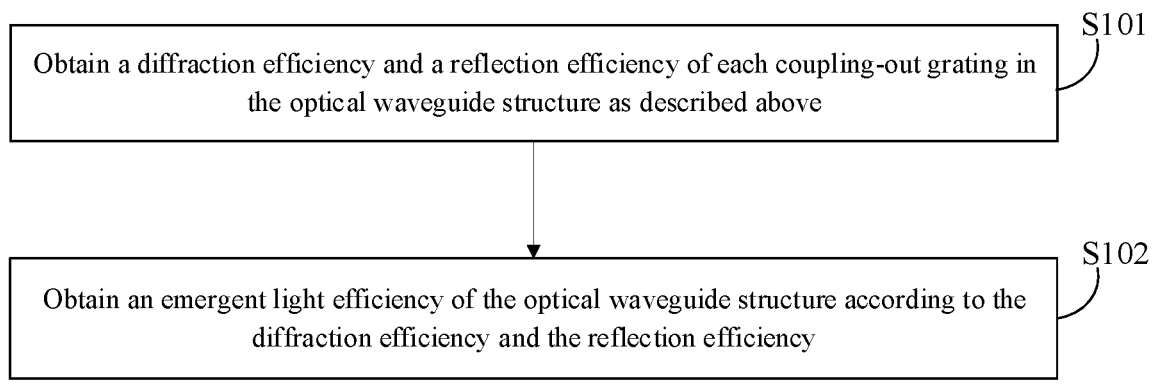
FIG. 5 schematically shows a flowchart of a method for obtaining an emergent light efficiency of an optical waveguide structure provided by some embodiments of the present disclosure.

Optionally, in some embodiments of the present disclosure, referring to FIG. 4, the optical waveguide structure 10 further includes: a collimating lens 14 disposed in parallel at a side of the coupling-in grating 12 away from the optical waveguide body 11. The collimating lens 14 is configured to emit the image light into the coupling-in grating in parallel.

Optionally, in some embodiments of the present disclosure, the collimating lens 14 includes: a plurality of aspherical lenses.

Optionally, in some embodiments of the present disclosure, referring to FIG. 4, the optical waveguide structure 10 further includes: a display screen 15 disposed at a side of the collimating lens 14 away from the coupling-in grating 12. The display screen is configured to emit the image light from a light-emitting side to the collimating lens 14.

In the embodiments of the present disclosure, the display screen 15 may be a monochrome micro oled screen.

Optionally, in some embodiments of the present disclosure, the plurality of coupling-out gratings 13 are arranged with equal space.

The present disclosure provides an AR device, including an optical waveguide structure as described in any one of FIGS. 1 to 4.

The AR device in the embodiments of the present disclosure may be an AR head-mounted device, particularly, AV glasses, etc. In addition, a Virtual Reality (VR) device may also adopt the optical waveguide structure provided in the embodiments, i.e., the optical wave structure in the AR device provided in the present embodiment is also applicable to the VR device.

FIG. 6 is a flowchart of a method for obtaining an emergent light efficiency of an optical waveguide structure provided by the present disclosure. The method includes the following steps.

In step S101, a diffraction efficiency and a reflection efficiency of each of the coupling-out gratings in the optical waveguide structure as described above are obtained.

The executive body of the embodiments of the present disclosure may be an electronic device that is deployed with an application having an emergent light efficiency calculation function of an optical waveguide structure, such as, a mobile terminal or a server. Optionally, the electronic device is a mobile terminal. A user may input an emergent light efficiency calculation instruction of an optical waveguide structure to the mobile terminal, whereby the mobile terminal obtains a diffraction efficiency and a reflection efficiency of each of the coupling-out gratings in the optical waveguide structure from a local or remote server. Certainly, the diffraction efficiency and the reflection efficiency may also be input by the user. This may be set specifically according to actual requirements. Limitations are omitted herein.

In step S102, an emergent light efficiency of the optical waveguide structure is obtained according to the diffraction efficiency and the reflection efficiency.

In the embodiments of the present disclosure, the emergent light efficiency of each of the coupling-out gratings of the optical waveguide structure is related to the emergent light efficiency of each of the coupling-out grating, and therefore the emergent light efficiency of the optical waveguide structure may be obtained by summing the emergent light efficiencies of each of the coupling-out gratings, which are calculated through the diffraction efficiency and the reflection efficiency.

In the embodiments of the present disclosure, the brightness within a pupil formed by the optical waveguide structure may be uniformly distributed by providing coupling-out gratings with different diffraction efficiencies in the optical waveguide structure such that coupling-out gratings at different arrangement positions may couple image light out of the optical waveguide body at the same brightness. Then, the emergent light efficiency of the optical waveguide structure may be calculated according to the diffraction efficiency and the reflection efficiency of each of the coupling-out gratings, thereby improving the efficiency of obtaining a total light efficiency of emergent light of the optical waveguide structure.

Optionally, in some embodiments of the present disclosure, the step of obtaining the emergent light efficiency of the optical waveguide structure according to the diffraction efficiency and the reflection efficiency includes the following operation.

Obtaining the emergent light efficiency of the optical waveguide structure according to the following formula:

$$\eta = \sum_{n=1}^{N} (R^{n-1} \times R^{n-2} ... R^0) \times T^n$$

$$R^n = 1 - T^n$$

wherein η represents the emergent light efficiency, n represents the number of coupling-out gratings, N represents the total number of coupling-out grating partitions, $R^{n-1}$ represents the reflection efficiency of the $(n-1)^{th}$ coupling-out grating, and $T^n$ represents the diffraction efficiency of the $n^{th}$ coupling-out grating.

It should be noted that the total number of coupling-out grating partitions may be the number of coupling-out gratings or the number of regions with different diffraction efficiencies in the same coupling-out grating.

Optionally, in some embodiments of the present disclosure, the diffraction efficiency of each of the coupling-out gratings in the optical waveguide structure is obtained by the following formula:

$$T_n = (N-n+1)^{-1}$$

wherein $T^n$ represents the diffraction efficiency of the $n^{th}$ coupling-out grating, n represents the number of coupling-out gratings, and N represents the total number of coupling-out grating partitions.

It should be noted that the total number of coupling-out grating partitions may be the number of coupling-out gratings or the number of regions with different diffraction efficiencies in the same coupling-out grating.

It should be understood that, although the various steps in the flowchart of the figure are shown in sequence as indicated by the arrows, these steps are not necessarily performed in the order indicated by the arrows. These steps are performed in no strict order unless explicitly stated herein, and may be performed in other orders. Moreover, at least some of the steps in the flowchart of the figure may include a plurality of sub-steps or stages that are not necessarily performed at the same time, but may be performed at different times. The sub-steps or stages are not necessarily performed in sequence, but may be performed in turn or in alternation with other steps or at least some of the sub-steps or stages of other steps.

"One embodiment", "embodiment", or "one or more embodiments" referred to herein means that a particular feature, structure, or characteristic described in connection with the embodiment is included in at least one embodiment of the present disclosure. In addition, it should be noted that instances of the phrase "in one embodiment" here are not necessarily all referring to the same embodiment.

In the description provided herein, numerous specific details are set forth. However, it will be appreciated that the embodiments of the present disclosure may be practiced without these specific details. In some instances, well-known methods, structures and technologies have not been shown in detail in order not to obscure the understanding of this description.

In the claims, any reference signs between parentheses should not be construed as limiting the claims. The word "comprising" does not exclude the presence of elements or steps other than those listed in the claims. The word "a/an" or "one" preceding an element does not exclude the presence of a plurality of such elements. The present disclosure may be implemented by means of hardware including several different elements, and by means of a suitably programmed computer. In the unit claims enumerating several devices, several of these devices may be embodied by one and the same item of hardware. The use of the words first, second, third, etc. does not denote any order. These words may be interpreted as names.

Finally, it should be noted that, the above embodiments are provided only to illustrate the technical solutions of the present disclosure but not to be limiting thereof. Although the present disclosure has been described in detail with reference to the foregoing embodiments, those ordinarily skilled in the art will appreciate that the technical solutions disclosed in the foregoing embodiments may still be modified, or some of the technical features thereof may be substituted equivalently. Such modifications or substitutions do not depart the corresponding technical solutions from the spirit and scope of the technical solutions in the various embodiments of the present disclosure in nature.

The invention claimed is:

1. A method for obtaining an emergent light efficiency of an optical waveguide structure, comprising:
  obtaining a diffraction efficiency and a reflection efficiency of each of coupling-out gratings in the optical waveguide structure; and
  obtaining an emergent light efficiency of the optical waveguide structure according to the diffraction efficiency and the reflection efficiency;
  obtaining the emergent light efficiency of the optical waveguide structure according to the diffraction efficiency and the reflection efficiency comprises:
  obtaining the emergent light efficiency of the optical waveguide structure according to the following formula:

$$\eta = \sum_{n=1}^{N} (R^{n-1} \times R^{n-2} ... R^0) \times T^n$$

$$R^n = 1 - T^n$$

wherein η represents the emergent light efficiency, n represents number of coupling-out gratings, N represents total number of coupling-out grating partitions, $R^{n-1}$ represents the reflection efficiency of the $(n-1)^{th}$ coupling-out grating, and $T^n$ represents the diffraction efficiency of the $n^{th}$ coupling-out grating;

obtaining the diffraction efficiency of each of the coupling-out gratings in the optical waveguide structure according to the following formula:

$$T_n = (N-n+1)^{-1}$$

wherein $T_n$ represents the diffraction efficiency of the $n^{th}$ coupling-out grating, n represents the number of coupling-out gratings, and N represents the total number of coupling-out grating partitions.

* * * * *